United States Patent [19]

Garcia

[11] Patent Number: 4,629,765

[45] Date of Patent: Dec. 16, 1986

[54] METHOD AND COMPOSITION FOR IMPROVED MELT PROCESSABILITY AND IMPACT PROPERTIES OF CHLORINATED POLY(VINYL CHLORIDE)

[75] Inventor: Dana S. Garcia, North Royalton, Ohio

[73] Assignee: The B. F. Goodrich Company, New York, N.Y.

[21] Appl. No.: 770,167

[22] Filed: Aug. 28, 1985

[51] Int. Cl.$^4$ .................. C08L 27/06; C08L 71/02
[52] U.S. Cl. .................................. 525/187; 524/502
[58] Field of Search ........................................ 525/187

[56] References Cited

U.S. PATENT DOCUMENTS 3,453,347 1/1969 Dreyfuss et al. ................. 525/187
3,632,688 1/1972 Le Gros ........................... 525/187

FOREIGN PATENT DOCUMENTS 0012559 5/1979 European Pat. Off. .
1133544 7/1962 Fed. Rep. of Germany ...... 525/187

OTHER PUBLICATIONS

P. Dreyfuss, et al, "Polyether Modifiers for Polyvinyl Chloride and Chlorinated Polyvinyl Chloride" (1973) *Polymerization Kinetics & Technology*, p. 125.

*Primary Examiner*—Carman J. Seccuro
*Attorney, Agent, or Firm*—Woodrow W. Ban; James R. Lindsay

[57] ABSTRACT

A composition of matter comprising a blend of CPVC having a chlorine content of between about 64% and 71% by weight and poly(ethylene oxide) in a ratio of approximately 0 to 20 parts poly(ethylene oxide) per 100 parts chlorinated poly(vinyl chloride). The resulting immiscible blend demonstrates improved impact resistance, improved shear viscosities properties and relatively unaffected strength properties. Optionally, glass fiber in either mat or loose glass form may be included in the blend of CPVC and PEO either by incorporation into the blend or by lamination of mats of glass fiber with layers of the blend of CPVC and PEO to provide even more enhanced tensile and other physical strength properties.

10 Claims, 4 Drawing Figures

METHOD AND COMPOSITION FOR IMPROVED MELT PROCESSABILITY AND IMPACT PROPERTIES OF CHLORINATED POLY(VINYL CHLORIDE)

FIELD OF THE INVENTION

This invention relates to chlorinated poly(vinyl chloride) and to methods for enhancing the melt processability and/or physical characteristics of chlorinated poly(vinyl chloride). More particularly, this invention relates to blends of chlorinated poly(vinyl chloride) with other polymeric materials providing such enhanced characteristics. Specifically, this invention pertains to miscible blends of chlorinated poly(vinyl chloride) with poly(ethylene oxide) providing such enhanced characteristics.

BACKGROUND OF THE INVENTION

While polymer blends have been reported in the literature from time to time, only within the past generation have polymer blends become sufficiently numerous and the advantages of polymer blends sufficiently apparent to warrant widespread investigation. While originally considered rare, miscible polymer blends more recently have been noted with increasing frequency.

Miscible blends of a second polymer and a first polymer have found utility in providing enhanced properties such as plasticization, tensile strength, melt processability, and increased resistance to heat distortion. Particularly in applications where polymeric materials are to be subjected to molding conditions, it is desirable that the modifying polymers blended into a polymer being molded be miscible in the first polymer; miscibility enhances the opportunity for avoiding weld-line strength difficulties and defects in finished, injection molded parts.

Likewise, blends characterized by immiscibility between polymer components of the blend have recently enjoyed increased attention as some such blends offer the potential for reduced melt viscosity and improved or desirable physical characteristics over the pure polymers. Where inclusion of a non-miscible second polymer as a minor constituent in a first polymer being processed can, for example, substantially reduce the temperature at which the first polymer can be processed, significant utility for such a blend may result. Likewise, where a blend of polymers, each substantially immiscible in the other, can enhance desirable solid-state physical characteristics or properties of the polymer in preponderance in the blend, substantial utility for the blend may result.

The prediction of miscibility between polymer pairs is still an art in infancy; miscibility is believed dependent upon a number of factors that include reactions between functional moieties pendant from one or more of the polymers, hydrogen bonding, and the like. Various suggestions have appeared for assisting in the selection of miscible or immiscible polymer pairs including an application of Flory's equation of state as set forth by L. P. McMaster, 6 *Macromolecules*, 760 (1973).

Other suggestions for useful tools in assessing miscibility of polymer pairs have included: two-dimensional solubility parameters, inverse gas chromatography; crystallization characteristics of polymer blends; and evaluation of glass transition temperature shifts, as suggested by L. M. Robeson, 24 *Polymer Engineering and Science*, p.p. 589 (June 1984). That the prediction of miscible polymer pairs is still an art, rather than a science, is indicated by, for example, by chlorinated polyethylene having 42 weight percent chlorine being miscible in poly(vinyl chloride), while chlorinated polyethylene havng a chlorine content less than 42% being immiscible in poly(vinyl chloride) as shown by Robeson, supra. at p.p. 588.

The prediction of properties of miscible and immiscible blends is also uncertain. While in some blend such desirable properties may follow simple additivity rules, other blends may show synergistic enhancement of desirable properties. Blends characterized by the components being immiscible typically are found to exhibit a tensile strength minimum while blends having components characterized by slight miscibility and a dual glass transition temperature may exhibit both a tensile minimum and a maximum as discussed by Fried, J. R., et al, 50 *Journal of Applied Physics*, p.p. 6052 (1979).

There is some significant indication that polymer blends tend to exhibit partial miscibility, and that graphical depictions of such partial miscibility tend to be of the minimum solution temperature type, that is those solubility curves having a minimum critical solution temperature below which a polymer pair exists in miscible state and above which, two phases are present, one phase being rich in a first polymer and the second phase being rich in a second polymer; Robeson, supra. p.p. 588. One possible explanation for a lack of solubility between polymer pairs may, in some cases, be related to the minimum critical solution temperature being lower than a glass transition temperature for one or both of the polymers; the polymers being below a glass transition temperature; a melt state for one or both of the polymers being non existent.

A number of substances forming blends with poly(vinyl chloride) have been identified in the literature, Robeson, supra. at p.p. 588, however, chlorinated poly(vinyl chloride) appears to have received less attention. Poly(vinyl chloride) and chlorinated poly(vinyl chloride) being chemically different compounds and particularly where properties of an immiscible blend of two polymers may be in part dependent upon such factors as hydrogen bonding and pendant functional moieties, the simple fact that poly(vinyl chloride) forms or does not form a desirable blend, whether miscible or immiscible, with a second polymer having desirable properties is not a particularly good indicator that chlorinated poly(vinyl chloride) will also form a blend with the second polymer having the desirable properties.

Poly(ethylene oxide) (PEO) blends in small proportions with another polymer have traditionally focused upon other such polymers as poly(acrylic acid) and poly(methacrylic acid) wherein strong complexing properties or miscibility with PEO characterizes the blend. Incompatible or immiscible polymer blends with PEO have attracted little interest in the literature except primarily for references to improved antistatic properties of some blends including PEO.

PEO has been mentioned as perhaps having utility in blends with poly(vinyl chloride) (PVC) as set forth in European Patent Application A1-0012559. PEO has been suggested for blending with chlorinated poly(vinyl chloride) (CPVC) in 128 *Polymerization Kinetics and Technology* p.p. 125–134, but the blend of CPVC and PEO discussed therein was characterized as leading "to a small improvement in impact strength and melt flow rate, but the heat distortion temperature was decreased."

While chlorinated poly(vinyl chloride) is possessed generally of performance characteristics and, particularly temperature performance characteristics, superior to poly(vinyl chloride), enhanced performance characteristics associated with a blend of chlorinated poly(vinyl chloride) and a second polymer together in an immiscible melt state could find substantial industrial utility.

DISCLOSURE OF THE INVENTION

The present invention provides a composition of matter comprising very slightly miscible to completely immiscible blends of chlorinated poly(vinyl chloride) (CPVC) having a chlorine content of between about 61% and 69% by weight and poly(ethylene oxide) (PEO). The composition of the instant invention is melt processable and is characterized by essentially complete mutual insolubility between the components. The composition of the instant invention displays enhanced impact resistance values as compared to CPVC absent added PEO.

The composition of the instant invention includes components essentially mutually insoluble notwithstanding heating to a temperature of at least 200° C. and preferably, to a temperature of not less than about 230° C. The composition of the instant invention may include processing aids and stabilizers typically employed in the manufacturing of articles formed of CPVC.

Blending chlorinated poly(vinyl chloride) and poly(ethylene oxide) at a temperature and under suitable pressure conditions whereby the chlorinated poly(vinyl chloride) and poly(ethylene oxide) are substantially mutually insoluble forms two phases characterized by being mechanically compatible in the blend. The resulting chlorinated poly(vinyl chloride) blend possesses improved flow characteristics in the melt state, improved impact resistance as indicated by Izod measurement, substantially unchanged tensile properties, and a more brittle characteristic upon elongation to failure when compared to pure chlorinated poly vinyl chloride and to mere blends of poly(vinyl chloride) and poly(ethylene oxide).

The above and other features and advantages of the instant invention will become more apparent when considered in conjunction with a description of the preferred embodiment of the invention that follows, forming a part of this specification.

BEST EMBODIMENT OF THE INVENTION

Figure 1:
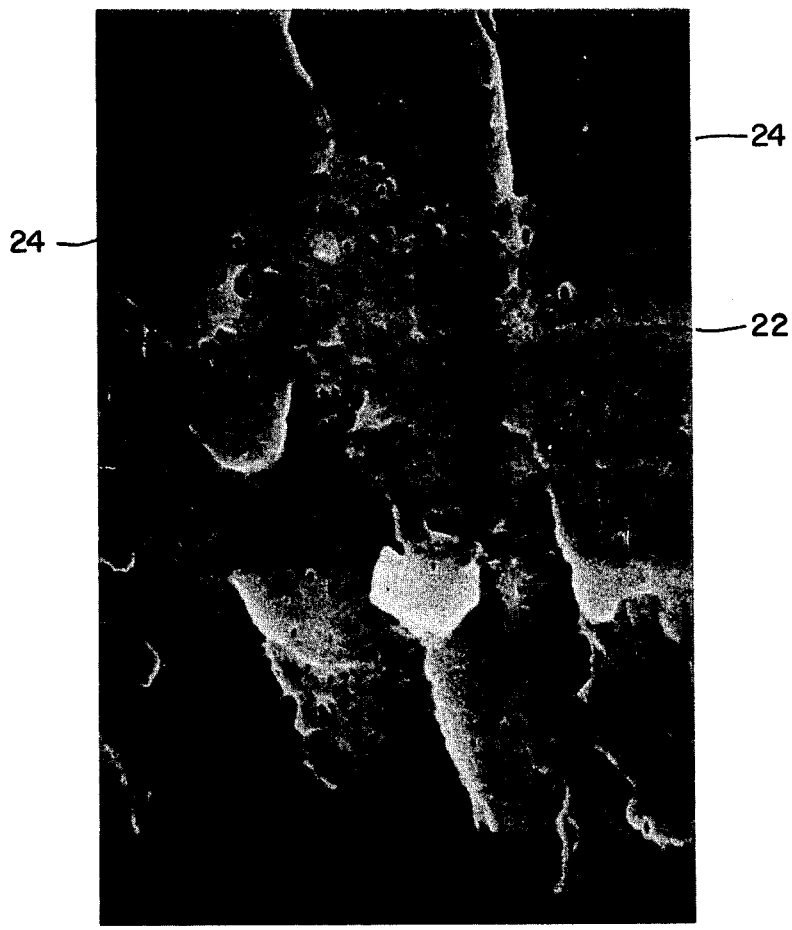
FIGS. 1-3 are photomicrographs of fracture surfaces for blends of CPVC and PEO at 5, 10 and 20 parts PEO per hundred parts CPVC respectively.

The present invention provides a composition of matter comprising a blend of chlorinated poly(vinyl chloride) and poly(ethylene oxide), the blended composition exhibits substantial properties of mutual insolubility between the components of the blend, and preferably is characterized by essentially complete immiscibility between the blended polymers. For convenience, as used herein, the term CPVC shall be taken to mean chlorinated poly(vinyl chloride), and the term PEO shall be taken to mean poly(ethylene oxide).

CPVC is a widely commercially available polymeric material that can be prepared in commercially well known manner such as by suspension chlorination of poly(vinyl chloride) (PVC). More recently, techniques such as chlorination of PVC employing liquid chlorine, as set forth in U.S. Pat. No. 4,377,459, have become available, and the use of CPVC prepared in any suitable or conventional manner is contemplated as within the purview of this invention.

It has been found, that CPVC employed in the practice of the instant invention should be a PVC material chlorinated to include at least 64% by weight chlorine and not more than about 71% by weight chlorine. A particular sample of CPVC is typically characterized by an average molecular weight and an inherent viscosity associated with a particular degree of PVC polymerization. CPVC is produced by the chlorination of PVC; PVC is the product of polymerizing vinyl chloride monomer and the chain length of any final PVC polymer molecule produced by the polymerization of vinyl chloride monomer may vary somewhat from molecule to molecule. Therefore, upon chlorination, the weight of individual molecules of chlorinated poly(vinyl chloride) may differ from molecule to molecule so that CPVC also may be characterized by an average molecular weight and an inherent viscosity. It has been found, however, that the degree of chlorination of the CPVC appears to be the controlling factor in determining whether blending with PEO will produce a blend having desirable properties. CPVC employed in the practice of the instant invention typically possesses a weight average molecular weight of between about 73,000 and about 140,000.

PEO employed in the practice of the instant invention can be any of the many commercial variations of PEO available in the marketplace. Like CPVC, the weight of individual molecules of PEO can vary from molecule to molecule, but in the practice of the instant invention it is preferable that the weight average molecular weight of PEO polymer employed be between about 100,000 and about 1,000,000. The lower limitation reflects a lower molecular weight limitation in material commercially available; it is believed that yet lower molecular weight PEO's would function acceptably in the practice of the instant invention.

The CPVC and the PEO are blended together in suitable or conventional manner. Preferably, blending is conducted above the glass transition temperature for either the CPVC or the PEO to facilitate mixing to form a blend. Alternately solvation of the polymers in a common solvent followed by coprecipitation from the common solvent is an equally preferred method for forming well mixed blends. By glass transition temperature, what is meant is the change in the amorphous region of a polymer from a hard and relatively brittle condition to a viscous or rubbery condition; usually brought about by changing the temperature.

In preferred embodiments, it is desirable that the CPVC and PEO be substantially immiscible one in the other. Optimally an essentially two-phased system should result from blending, representing an immiscible state between the polymers. The percentage of PEO in the blend preferably may vary from near zero to about 20% by weight of the CPVC in the blend. The actual percentage represented by the PEO in the blend in practice will be a percentage producing desirable physical characteristics in a final structure formed from the blended polymers.

Structures formed from the blended composition of the instant invention typically are formed by so called melt processing techniques such as melt spinning, casting, compression molding or injection molding from the composition in a melt phase. The instant invention finds particular utility in so-called compression molding, that is, molding operations characterized by low sheer. Structures produced from the composition of the instant invention display improved impact resistance as indicated by Izod measurements and demonstrate brittle failure upon elongation testing rather than the ductile failure mode characterizing CPVC without PEO blended therein.

Blends of CPVC and PEO can be formed by direct blending of melt state polymeric materials at a temperature above the glass transition temperature for either pure polymer. However, achievement of a blended state may be rendered difficult in such direct blending methods by the elevated viscosity demonstrated by both resinous CPVC having, particularly, chlorine contents significantly in excess of 67% by weight and by PEO materials above a glass transition temperature but below a thermal degradation temperature for the individual components being blended.

Accordingly, it is has been found occasionally advantageous to blend the CPVC and PEO polymeric resins employing solution blending techniques in order to form blends therebetween. In a solution blending operation, the polymers to be blended are dissolved in a solvent in which the polymers are mutually quite soluble, generally at an elevated temperature. The solution of polymers is then poured rapidly into a second solvent in which the first solvent containing the dissolved polymers is soluble but in which the polymers are not soluble. A closely intermixed polymeric precipitate results which can be recovered employing well-known techniques.

for three minutes in accordance with the proportions set forth in Table I. The resulting blends as shown in Table I were evaluated to determine physical properties.

Glass transition temperatures for the blends displayed in Table I were determined on a Perkin-Elmer ® DSC-2 differential scanning calorimeter at a scan rate of 40° C. per minute. The glass transition temperature ($T_g$) was taken as the midpoint of the step in the curve less a 3.5° C. negative correction. Correction was applied to the temperature scale to eliminate the effect of thermal lag. Accuracy is estimated as within plus or minus 1° C.

Melt viscosity was determined using a capillary Instron ® rheometer. Measurements were obtained over a wide range of shear rates performed at between 180° C. and 200° C. with a die diameter of 0.152 centimeters and a L/D ratio of 8.2. Based upon melt viscosities determined by the rheometer, shear stresses, corrected shear rates, and shear viscosities were calculated.

Heat deflection temperatures (HDT), impact resistance (Izod) and tensile modulus were determined in accordance with standard ASTM procedures with between 4 and 6 specimens being subjected to each determination of physical properties in order to increase data reliability.

Thermogravimetric analysis was performed on a Perkin Elmer thermogravimetric instrument at a heating rate of 20° C. per minute in a nitrogen atmosphere. Dynamic thermostability tests were performed on a Brabender ® 2503 extruder on certain of the blends set forth in Table I at die temperatures of 180° C. and at 220° C. by charging 68 grams of a blend, preheating the extruder for three minutes and operating the extruder at 40 rpm. While considerable scatter exists in the Brabender test results, it would appear that the inclusion of PEO in CPVC resin can reduce the heat stability of the resulting resin blend by as much as 50%. But thermogravimetric results indicate that under low or no-sheer conditions the stability of CPVC including PEO is not statistically different from the CPVC absent blended PEO.

TABLE I

| Blend #[4] | 1 | 2 | 3 | 4 | 5 | 6 | 7 | 8 | 9 |
|---|---|---|---|---|---|---|---|---|---|
| CPVC[1] | 100 | 100 | 100 | 100 | 100 | 100 | 100 | 100 | — |
| dibutyl tin[2] | 3 | 3 | 3 | 3 | 3 | 3 | 3 | 3 | — |
| Chlorinated polyethylene | — | — | — | — | 10 | 10 | 10 | 10 | — |
| Oxidized polyethylene homopolymer | — | — | — | — | — | — | — | 1.5 | — |
| PEO[3] | — | 5 | 10 | 20 | 1.5 | 10 | — | — | 100 |
| Blend Properties | | | | | | | | | |
| Tg°(C) | 117.50 | 113.5 | 112.50 | 113.50 | 111.50 | 109.50 | 116.50 | 116.50 | −66 |
| $T_M$°(C.) | — | — | — | — | — | — | — | — | 61 |
| Tensile Modulus ($10^5$ psi) | 2.24 ± 0.05 | 2.25 ± 0.09 | 2.01 ± 0.50 | 1.97 ± 0.06 | 1.36 ± .06 | 1.28 ± .04 | 1.5 ± .09 | 1.4 ± .14 | — |
| Break Elongation % | 47.2 ± 22.1 | 23.4 ± 7.3 | 7.9 ± 2.6 | 4.8 ± 1.3 | 25.5 ± 4.8 | 23.4 ± 7.0 | 43.5 ± 21.4 | 24.8 ± 12.8 | — |
| Break Stress ($10^3$ psi) | 7.9 ± .55 | 6.0 ± .32 | 5.9 ± .37 | 4.6 ± .23 | 6.0 ± .5 | 4.7 ± .14 | 6.5 ± .50 | 6.3 ± .03 | — |
| Izod (ft-lb/in), @ 25° C. | .363 ± .15 | .48 ± .03 | 1.54 ± .45 | 0.69 ± .13 | 1.16 ± .24 | 3.62 ± .43 | 1.05 ± .21 | 1.8 ± .71 | — |
| HDT[5] (°C.) @ 264 psi | 95 | 92 | 86 | 79 | 91 | 88 | 95 | 95 | — |

[1]B. F. Goodrich Temprite ® 627-563-0-1009-1 (67% Cl₂ by wt.)
[2]Isooctylthioglycolate
[3]Poly(ethylene oxide) M.W. 100,000
[4]Weight per hundred weight CPVC
[5]Heat distortion temperature

EXAMPLE 1

Blends of chlorinated poly(vinyl chloride) (CPVC) were prepared by room temperature mixing in a kitchen blender followed by mixing on a Getty mill at 180° C.

Referring to Table I, it may be seen that the addition of poly(ethylene oxide) (PEO) (run 3) at a level of about 10 parts per hundred parts CPVC produces a substantially elevated Izod value reflecting significantly enhanced impact resistance. This impact resistance peaks at approximately 10 parts PEO and declines as the PEO is reduced in content to five parts (run 2) and also declines as the PEO content is increased to 20 parts (run 4).

In addition, with increasing PEO content, the break elongation as a percent declines steadily, and the break stress in pounds per square inch also declines steadily. The tensile modulus in pounds per square inch also declines modestly with increasing PEO content. The glass transition temperature, however, appears to go through a slight minimum at approximately 10 parts PEO per hundred weight of CPVC. This reduced glass transition temperature may allow blends of CPVC and PEO to be processed at lower temperatures than would otherwise be required for the individual components processed alone.

In runs 5-8 of Table I, chlorinated polyethylene, a typical CPVC processing additive, was included in the blend. The same trends in physical characteristics were noted for the blends containing chlorinated polyethylene in addition to poly(ethylene oxide); this enhancement of consistant performance characteristics is an indication that the poly(ethylene oxide) provides an enhancement of performance characteristics separate and distinct from thermal stabilizers such as dibutyl tin and lubricants such as chlorinated polyethylene. The characteristics of pure poly(ethylene oxide) as used in forming the blends of Table I is set forth as run 9.

EXAMPLE 2

Blends of CPVC and PEO were formulated in accordance with the procedure of Example 1 in the proportions set forth in Table II. The resulting blends of CPVC and PEO were formed into sheets and interlayered with glass fiber mats. The interlayered sheets and glass fiber mats were subjected to compression molding at 200° C. and 1000 psi (6894 kPa) to produce sheet-like glass fiber reinforced composite structures of the CPVC-PEO compounds. The proportion of glass matting employed in forming the composite structures is set forth in Table II and represents parts glass matting per 100 weight of the blend of CPVC, PEO, and dibutyl tin. Again, it may be seen that the Izod impact resistant measurements improve with the inclusion of PEO and that flexural strength and flexural modulus may also enjoy modest increases with the inclusion with PEO.

TABLE II

| Blend #[3] | #10 | #11 | #12 | #13 | #14 |
|---|---|---|---|---|---|
| CPVC[2] | 100 | 100 | 100 | 100 | 100 |
| Dibutyl tin | 3 | 3 | 3 | 3 | 3 |
| PEO | — | — | 10 | 10 | 10 |
| Glass mat[1] | — | 25.75 | — | 12.56 | 28.25 |
| Blend Properties | | | | | |
| Flexural Modulus ($10^5$ psi) | 2.40* | 6.3 | 3.5 | 3.7 | 4.4 |
| Flexural Strength ($10^3$ psi) | 7.80* | 22 | 11.2 | 10.1 | 13.2 |
| Izod (ft-lb/in), | | | | | |
| @ 25° C. | .36 | 3.8 | 1.5 | 7.8 | 12.3 |
| @ −40° C. | — | 3.3 | 0.7 | 5.6 | 9.2 |
| HDT[5] (°C.), @ 264 psi | 95 | 116 | 86 | 108 | 111 |

[1]Owens Corning M8680 mat (1 1/12 1 ft 2 oz × 36")
[2]B. F. Goodrich Temprite ® 627 × 563
[3]Wt per 150 weight CPVC or PVC
*The modulus and strength are determined in tensile mode for this sample.

EXAMPLE 3

Poly(vinyl chloride) was blended in accordance with the method of Example 1 in the proportions set forth in Table III. For comparison in Table III the CPVC blends with PEO (Runs 1-4) in Table I are reproduced as Runs 15-18 in Table III.

TABLE III

| | CPVC Blends | | | | PVC Blends | | | |
|---|---|---|---|---|---|---|---|---|
| Blend #[3] | 15 | 16 | 17 | 18 | 19 | 20 | 21 | 22 |
| CPVC[1] | 100 | 100 | 100 | 100 | — | — | — | — |
| PVC[2] | — | — | — | — | 100 | 100 | 100 | 100 |
| Dibutyl tin | 3 | 3 | 3 | 3 | 3 | 3 | 3 | 3 |
| PEO | 0 | 5 | 10 | 20 | 0 | 5 | 10 | 20 |
| Tg° (C.) ± 1° C. | 117.5 | 113.5 | 112.5 | 113.5 | 79.5 | 72.5 | 77.5 | — |
| Tensile Mod. ($10^5$ psi) | 2.24 | 2.25 | 2.01 | 1.97 | 2.08 | 2.15 | 2.22 | 2.01 |
| % Break Elongation | 47.2 | 23.4 | 7.9 | 4.8 | 108 | 111 | 123 | 16 |
| Break Stress ($10^3$ psi) | 7.9 | 6.0 | 5.9 | 4.6 | 6.2 | 4.6 | 5.0 | 4.1 |
| Izod (ft-lb/in), @ 25° C. | .36 | .48 | 1.54 | 0.69 | .33 | .60 | .60 | .72 |
| HDT (°C.), @ 264 psi | 95 | 92 | 86 | 79 | 68 | 68 | 61 | 61 |

[1]B. F. Goodrich Temprite ® 627 × 563
[2]B. F. Goodrich Geon ® PG
[3]Wt per 100 wt PVC or CPVC It is clear from Table III that CPVC blends with PEO at ten parts per 100 parts CPVC undergoes a maximam in impact resistance as indicated by the Izod values whereas PVC demonstrates no such maxima in impact resistance at the low level PEO loadings investigated and depicted in Table III. Accordingly, CPVC when blended with a relatively small amount of PEO undergoes a substantial and surprising increase in impact resistance which is maximized between 5 and 20 parts PEO per 10;0 parts CPVC and appears to maxima around 10 parts PEO per hundred parts CPVC. Conversely, PVC undergoes a more gentle improvement in impact resistance as indicated by Izod values with increasing PEO content. But this general improvement is free of a maxima as would characterize blends of CPVC and PEO at approximately 10 parts PEO.

Figure 4:
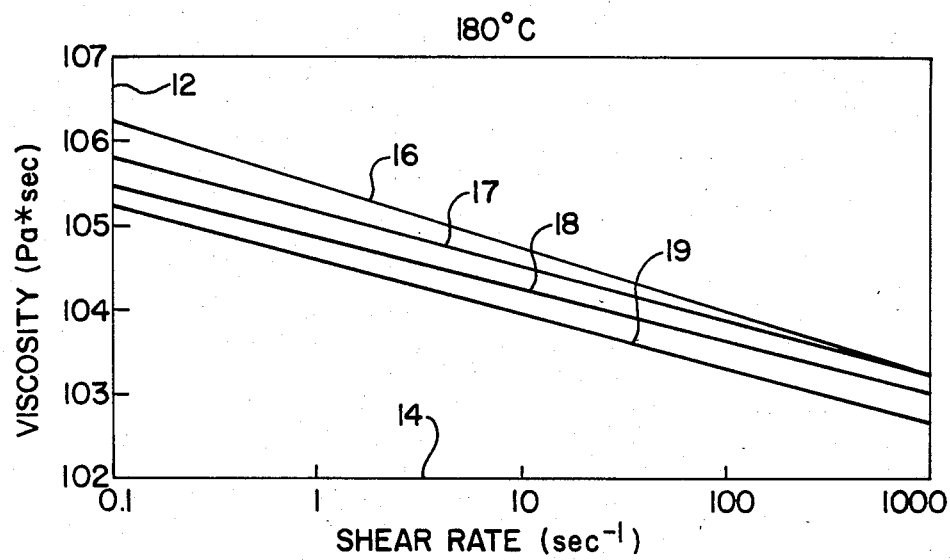
FIG. 4 is a graphical representation of a relationship between shear rate in $sec^{-1}$ plotted on an abcissa versus viscosity (Pa.sec) plotted on an axis for various blends of the instant invention.

Referring to the drawings, FIG. 4 represents a relationship between the viscosity of blends of PEO and CPVC plotted on an axis 12 against shear rate in sec$^{-1}$ plotted on an absicuss 14. The curves 15, 16, 17, 18 represent blends of CPVC and PEO wherein the PEO content represents 0, 5, 10, and 20 parts per hundred weight CPVC in the blend respectively. It may be seen that increasing levels of PEO decrease the viscosity of blends of PEO and CPVC, and that the inclusion of between 10 and 20 parts PEO per hundred weight CPVC can result in a reduction of the shear viscosity by as much as between ½ and one order of magnitude at low shear rates. The shear viscosities represented in FIG. 4 by plots 16, 17, 18 and 19 were determined at 180° C.

Figure 2:
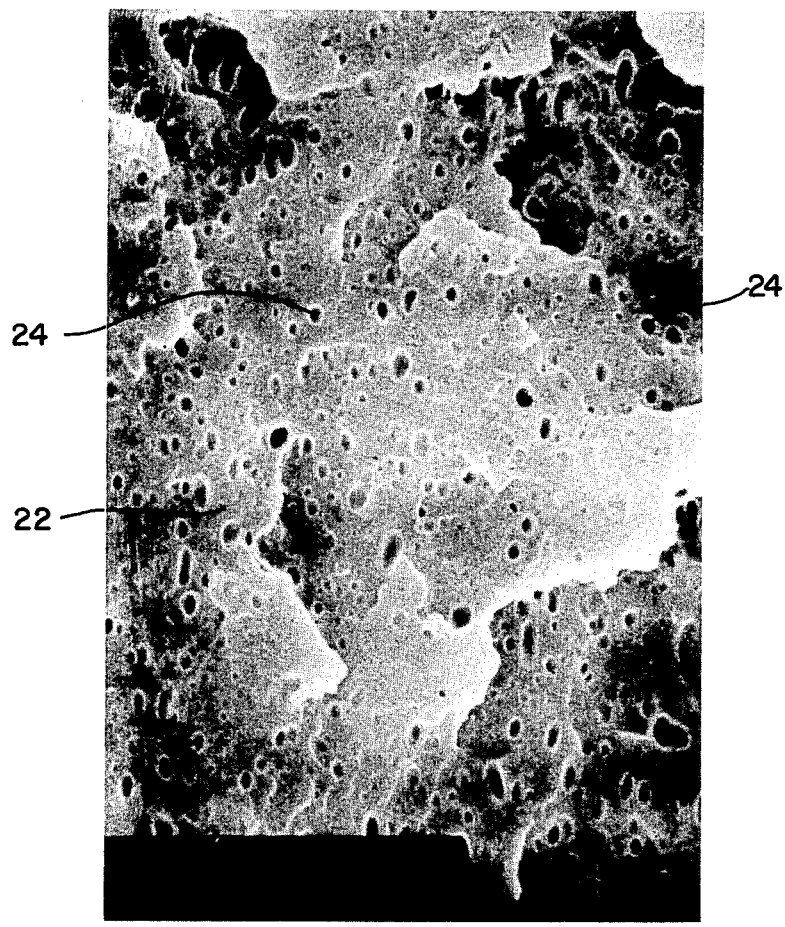
Figure 3:
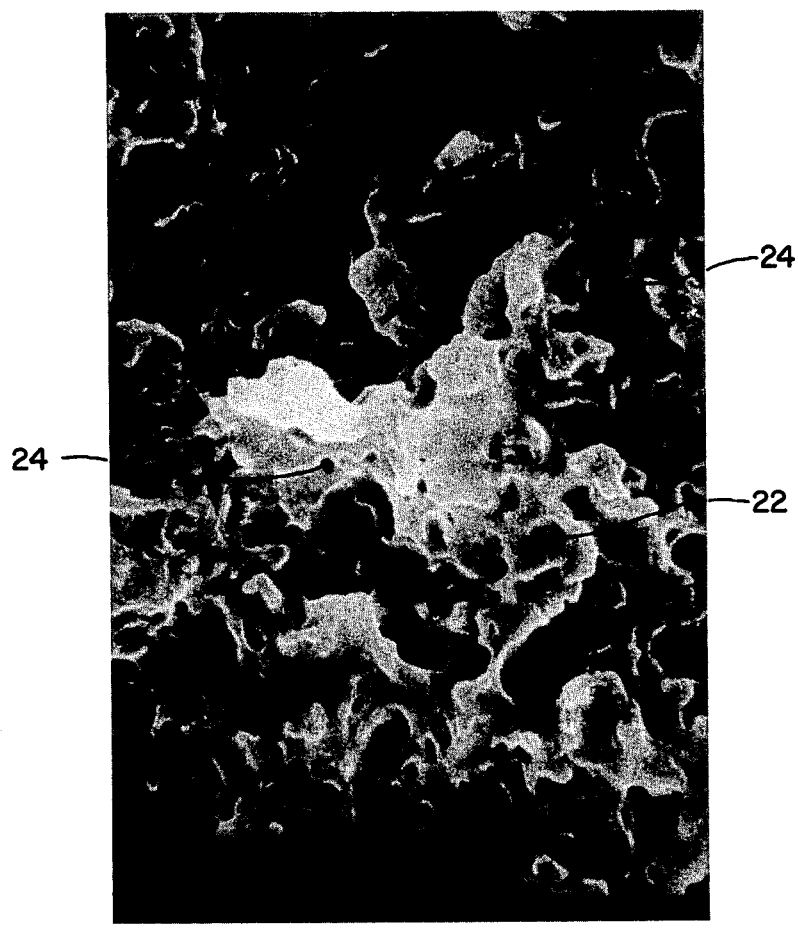

FIGS. 1-3 are photomicrographic representations of fracture surfaces of blends of PEO and CPVC wherein the blend contains 5, 10 and 20 parts PEO per hundred weight of CPVC respectively. The magnification of the electron microscopy of the fracture surface as depicted in FIGS. 1-3 was accomplished at 300 power. The FIGS. 1-3 clearly show immiscible blending between the PEO and the CPVC characterized by CPVC rich zones 22 and PEO rich zones 24.

The blends of the instant invention find utility in providing increased impact resistance to chlorinated poly(vinyl; chloride). Particularly the blends of the instant invention can provide improved strength characteristics where employed in structures with glass fibers, whether such glass fibers are so-called long fibers, that is fibers having a interwoven mat like characteristic, or are so-called short fibers that is loose glass fibers without any inherent matrix or mat structure introduced by suitable or conventional means into the blend of CPVC and PEO. Even small quantities of fiberglass can provide advantages respecting physical characteristics such as tensile strength. An upper limitation on fiberglass content in such blends is believed established by a minimal amount of CPVC-PEO blended polymer to yield a coherent entity having desired shape. Preferably the fiberglass does not exceed about 50% by weight of the non-fiberglass components of the blend.

The CPVC employed in the practice of the instant invention should have a chlorine content sufficiently elevated to yield substantially enhanced impact resistance at relatively low PEO contents in a blend. It is believed that the lower limitation for chlorine content to achieve the desirable properties of blends of the instant invention is approximtely 64% chlorine by weight of the CPVC. It is believed that no practical upper limitation exists to formation of desirable blends in accordance with the instant invention with respect to chlorine content of the CPVC. However, from a practical limitation, the upper chlorine limitation based on available sources of CPVC would appear to be approximately 71% by weight chlorine of the CPVC.

Accordingly, the impact resistance of CPVC may be enhanced by the inclusion of PEO by blending in a quantity not exceeding 20% by weight of the CPVC. Preferably at least 5% PEO is included and it is believed that the inclusion of at least 7% PEO can produce desirably elevated impact resistance properties. The resulting blends having not more than about 20% PEO and preferably at least about 5% PEO by weight, and most preferably at least about 7% by weight.

While a preferred embodiment of the invention has been shown and described in detail, it is apparent that various modifications may be made thereto without departing from the scope of the claims that follow.

What is claimed is:

1. A composition of matter consisting essentially of chlorinated poly(vinyl chloride) having a chlorine content of between about 64% and 71% by weight and poly(ethylene oxide), the poly(ethylene oxide) comprising at least 5% by weight of the composition and not exceeding about 20% by weight of the chlorinated poly(vinyl chloride).

2. The composition of matter of claim 1, the poly(ethylene oxide) comprising at least 7% by weight of the composition.

3. The composition of claim 1, the chlorinated poly(vinyl chloride) and poly(ethylene oxide) being essentially mutually insoluble following heating to 200° C. and subsequent cooling.

4. The composition of claim 1, including fiber glass in an amount not exceeding 50% by weight of the poly(vinyl chloride).

5. A method for improving the processability and impact properties of chlorinated poly(vinyl chloride) having a chlorine content of between about 64% and 71% by weight comprising the steps of: providing poly(ehtylene oxide) in an amount of at least 5% by weight and not exceeding 20% by weight of the chlorinated poly(vinyl chloride) and blending the chlorinated poly(vinyl chloride) with the poly(ethylene oxide) for form a two component polymer blend substantially insoluble system.

6. The method of claim 5, including the step of including in the blend fiberglass in a quantity not exceeding 50% by weight of chlorinated poly(vinyl chloride) in the blend.

7. The method of claim 5, the poly(ethylene oxide) being present in a quantity of at least 7 parts per hundred weight of chlorinated poly(vinyl chloride).

8. The method of claim 6, the poly(ethylene oxide) being present in a quantity of at least 7 parts per hundred weight of chlorinated poly(vinyl chloride).

9. The method of claim 5 including the step of forming the blend at a temperature of at least 200° C.

10. The method of claim 9, the temperature being at least 230° C.

* * * * *